July 1, 1969     V. K. ELORANTA     3,452,661
PHOTOGRAPHIC APPARATUS
Filed July 25, 1967     Sheet 1 of 3
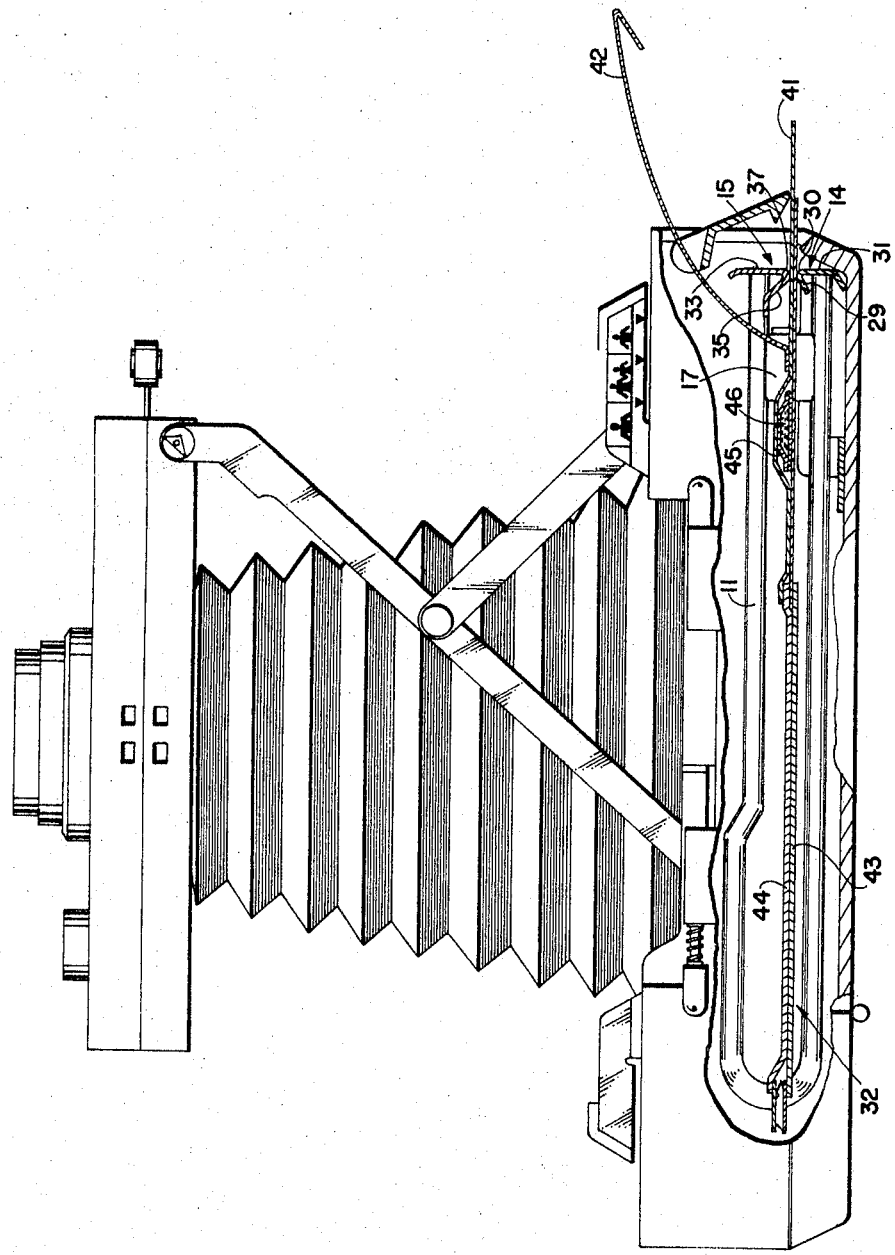
INVENTOR.
Vaito K. Eloranta
BY
Brown and Mikulka
and
Leonard S. Selman
ATTORNEYS

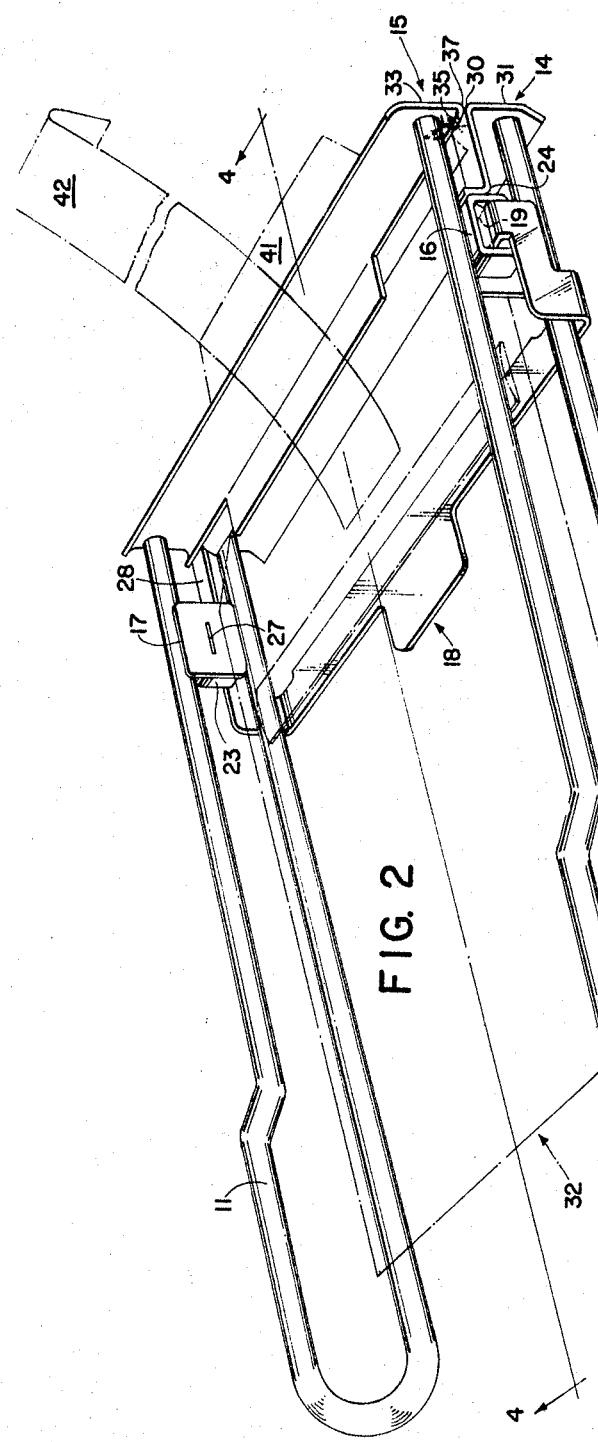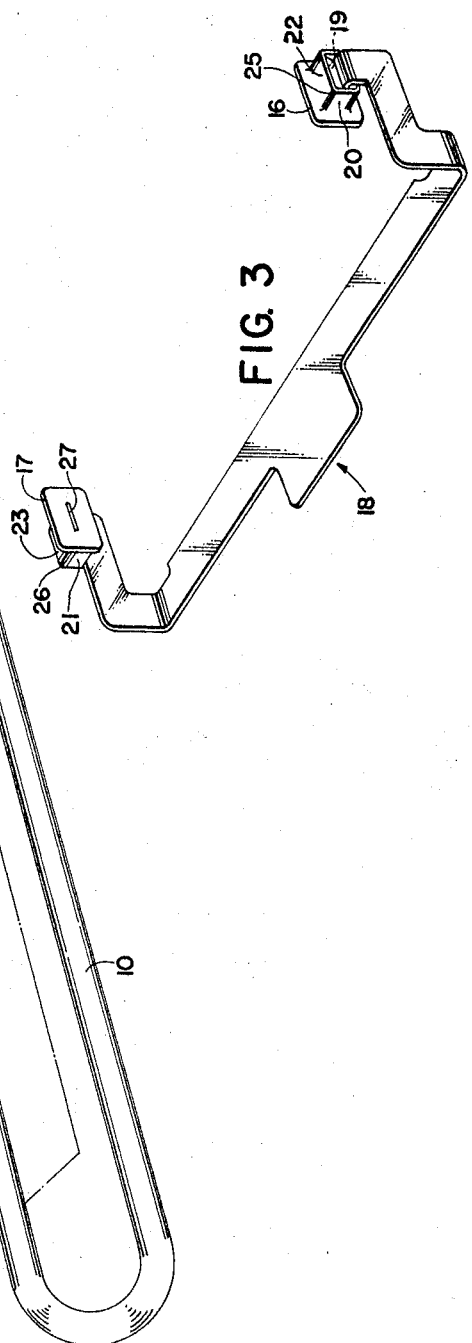

United States Patent Office 3,452,661
Patented July 1, 1969

---

3,452,661
PHOTOGRAPHIC APPARATUS
Vaito K. Eloranta, Needham, Mass., assignor to Polaroid Corporation, Cambridge, Mass., a corporation of Delaware
Filed July 25, 1967, Ser. No. 655,834
Int. Cl. G03b 17/52
U.S. Cl. 95—13                    7 Claims

ABSTRACT OF THE DISCLOSURE

This application discloses photographic processing apparatus for distributing a liquid in contact with a photographic sheet; and particularly apparatus including a pair of juxtaposed pressure-applying members for distributing a liquid between a pair of superposed photographic sheets and means for increasing the separation between said juxtaposed members for purposes of cleaning or the like.

Cross reference to related applications

The invention disclosed herein is related to the subject matter disclosed in copending applications; Ser. No. 655,831 filed July 25, 1967; Ser. No. 655,833 filed July 25, 1967; Ser. No. 655,835 filed July 25, 1967; and Ser. No. 655,832 filed July 25, 1967 assigned to the same assignee.

Summary of the invention

The present invention is directed to a device which may be incorporated in a self-developing camera wherein a photographic transfer image is produced by moving a pair of film sheets including an exposed negative photosensitive sheet and a superposed positive receiving sheet, between a pair of juxtaposed pressure-applying members for distributing a processing liquid or developer between and in contact with the sheets. The preferred embodiment of the invention as disclosed herein provides a narrow gap between a pair of spring-mounted sheet metal members through which the sheets are moved while the liquid introduced between the sheets is spread uniformly between and in contact with the entire facing surfaces of the sheets in a direction opposite the movement of the sheets relative to the pressure-applying sheet metal members. For purposes of cleaning or the like, it has been found to be desirable to provide a means for temporarily widening the gap through which the sheets are moved and it is toward this objective that the present invention is directed.

The spreader system which incorporates the present invention has many advanced features including its integral precise construction resulting in important savings in cost of manufacture, its compactness and lightweight and its removability from the photographic cameras designed for its use therewith. An additional feature which must be considered in connection with any liquid spreading system is the ability to clean the spreading surfaces from undesirable building of processing liquid or other foreign matter which may result from continued use over a long period of time. This particular invention is directed to a means for making all surfaces of the spreader system easily accessible, especially those surfaces bordering the narrow gap through which the sheets travel while the processing liquid is spread therebetween.

The preferred embodiment of the spreading apparatus includes a pair of sheet metal members which are mounted on a pair of pre-stressed rod spring members bent double to define a pair of resiliently connected cantilever arms to which the spreader members are fastened. The spring members urge the spreader members toward each other with the force necessary to maintain the narrow gap between the spreader members as the film sheets are moved therethrough. The present invention comprises camming means mounted between the connected spring arms which are constructed to apply a limited amount of force to the spring arms forcing them apart and widening the narrow gap to facilitate the cleaning of the sheet contacting surfaces on the spreader members. The fact that the camming means are limited in the force they apply on the spring arms is an important feature of the invention in that this eliminates the danger of overstressing the springs. A further feature of considerable advantage is the means to maintain the gap between the sheet metal spreader members in the widest or open position while cleaning may be accomplished only returning to the closed narrow position upon manual actuation.

Accordingly, it is an object of this invention to provide an improved spreading device including a pair of spreader members having straight parallel adjacent portions juxtaposed to form a narrow pressure-generating gap, spring means for urging the spreader members toward each other and separating means operable to urge the spring means in a direction forcing the rigid members apart and widening the gap.

It is a further object of this invention to provide such an improved spreading device that has few parts, is relatively low in cost of manufacture, is compact and lightweight yet will perform in an entirely satisfactory manner.

The invention accordingly comprises the apparatus possessing the construction, combination of elements and arrangement of parts which are exemplified in the following detailed disclosure, and the scope of the application of which will be indicated in the claims.

Brief description of the drawings

FIGURE 1 is a side elevational view of a camera having mounted within and shown in cross-section the preferred embodiment of the invention including the spring mounted spreader members and the separating means.

FIG. 2 is a perspective view of the apparatus embodying the invention removed from the camera and including the spring mounted sheet metal spreader members and the separating means for urging the spreader members apart.

FIG. 3 is a view of the separating means shown removed from its position between the spring arms;

Description of the preferred embodiment

The spreading of a fluid composition in a uniformly thin layer between a pair of superposed sheets may be employed for effecting a number of various photographic processes and is particularly adapted, for example, to the processing of an exposed photosensitive stratum on one of the sheets to develop a latent image in the photosensitive stratum and/or produce a positive image in the other sheet by diffusion and transfer of reagents from the photosensitive stratum through or into the fluid layer. The present invention is concerned with the provisions of a spreading device adapted to be employed, for example, with a film unit comprising a first sheet having a photosensitive surface stratum and a second sheet superposed with the first sheet and having a surface stratum disposed adjacent the photosensitive stratum and adapted to receive a positive photographic image. The processing fluid may be supplied in a pod interposed between the sheets of the film unit and adapted to be moved through the gap between the pressure members so as to rupture the pod and distribute its contents between the sheets. After long continued use there is likely to be found on one or both of the pressure members a buildup of undesirable material such as small amounts of solidified processing liquid. In their closed pressure-generating positions, however, access to the sheet contacting surfaces of the pressure members is severely limited making it desirable to spread apart the surfaces for easier cleaning. Care must be taken not to twist or bend the springs or sheet metal elements of the device by uncontrolled spreading forces applied to the apparatus since misalignment may result destroying the uniform spread capabilities of the device. The present invention permits the spreading forces to be applied in a carefully controlled manner and consists of a camming element carefully located between the pressure member supporting spring arms and having means to apply a limited amount of force thereto.

FIGURES 1 to 7 of the drawings show the liquid distributing means of the present invention including a pair of generally U-shaped springs 10 and 11 which serve both to support a pair of precisely formed sheet metal spreader members 14 and 15 and to urge said members toward each other. The springs are spot welded to the spreader members adjacent the outside ends thereof with great care taken to locate said welds since the forces acting on said spreader members must be applied with great accuracy to achieve a uniform spread.

Figure 4:
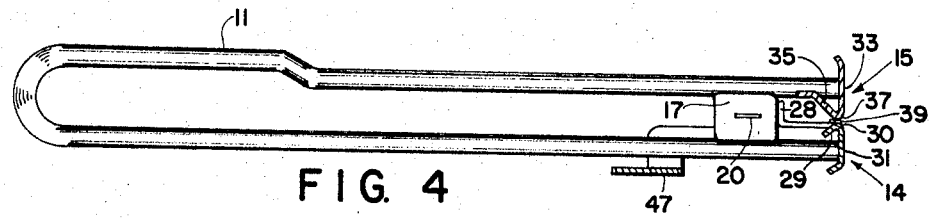
FIG. 4 is a sectional view taken along line 2—2 in FIG. 2 and shows the spreader members in closed position;.
Figure 5:
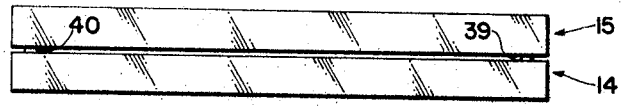
FIG. 5 is a front view of the apparatus showing the gap between the spreader members in the closed position.
Figure 6:
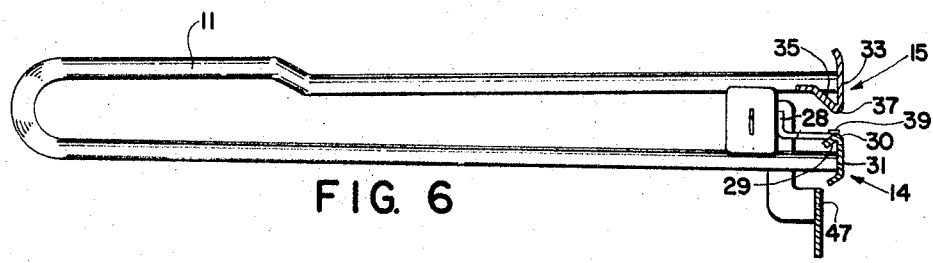
FIG. 6 is a sectional view as shown in FIG. 2 but with separating means angularly displaced to force the spreader members apart into their open position.
Figure 7:
FIG. 7 is a front view of the apparatus showing the wide gap between the spreader members in the open position.

The cam type separating means is shown in FIGURES 1 and 2 between the arms of springs 10 and 11 and consists of a pair of camming elements 16 and 17 which may be formed of a molded plastic material such as polypropylene. Elements 16 and 17 are positioned near the ends of the spring arms so that only a relatively small amount of force is required to forcibly separate the spreader members 14 and 15. The force is applied by means of element 18 which has a pair of end portions 19 and 27 embedded into camming elements 16 and 17. The portion of element 18 extending between the springs 10 and 11 is manually grasped and forcibly rotated in a counterclockwise direction to force the spreader members from their closed position as shown in FIGS. 4 and 5 to their open position as shown in FIGS. 6 and 7. The camming elements 16 and 17 are shaped as shown in FIGS. 3 through 7, so that their shorter dimensioned shoulder portions 22 and 23, extend between the spring arms in the closed position and the longer dimensioned shoulder portion 22 and 23, extend between the spring arms in the open position. As the cam elements are rotated against portions 24 and 28, which are formed from the same sheet metal blank as spreader member 15, rounded corners 25 and 26 pass overcenter so that the camming forces will keep the spreader members in their open position until manually returned to the closed position.

FIGURES 1 and 2 illustrate the shape of the spreader members 14 and 15 as they converge toward one another to form a throat through which the layers of photographic sheet material are manually drawn. The spreader members are each formed of sheet metal which has the inherent capability of being easily bent to a desired shape. Thus, a single piece of sheet metal may be cut out and bent to form a guide portion 29, the small radius sheet contacting edge 30, and the support connecting portion 31. The guide portion 29 serves to guide the sheets of photographic material 32 into the gap between the spreader members. The edge 30 is formed as precisely as economically feasible to conform to the similar edge on spreader 15 to provide a uniform spread of the developer between the sheets. The support connecting portion 31 of the spreader member is bent and shaped to provide a suitable surface for welding the end of a pair of generally U-shaped cantilever type springs 10 and 11 to each end of the spreader member.

The other spreader member 15 also has a support connecting portion 32 to which is welded the ends of the springs 10 and 11. This member has a back portion 35 which also helps to guide the sheets of film into the gap between the spreader members. The angle at which this back portion is bent is carefully controlled to provide a second small radius sheet contacting edge 37 which conforms to edge 17 on the spreader member 14.

A pair of shoulders or bumps 39 and 40, as shown in FIG. 3, are formed in one of the spreader members near the ends of the sheet contacting edge portion to pre-gap the edges apart so that the film leader 41, as shown in FIG. 2, may be manually pulled through the gap between the edges by means of the tab 42 typically heat sealed to the film leader. It should be understood that the film sheets as shown in FIG. 1 are in processing position ready to be removed from the camera. U.S. Patent No. 2,991,702 shows a plurality of the film sheets stacked in a film pack as they are used in many of the present day self-developing cameras. In picture taking position, the negative sheet 43 with its photosensitive surface faces the open front of the film pack and the taking lens and then is pulled around and behind the positive sheet 44 by tab 42 as shown in FIGURE 1 in superposed position ready for processing. As the tab 42 pulls the leader 41 through the gap, the back portion 35 of spreader member 15 will support the leader at a position just before the gap and if the heat seals between tab 42 and the leader 41 are hard to break, this support will prevent the leader from being pulled back through the gap into the camera. The leader 41 is then manually grasped and the photographic material comprising the negative sheet 43 and the positive sheet 44 and the developer pod 45 is pulled through the gap whereby the pod is broken and the developer 46 is uniformly spread between the positive and negative sheets.

It can be seen in FIGS. 4 and 5 especially, how the accessibility to the gap surfaces is restricted and further how a small amount of foreign material might prevent passage of the sheet material through the gap. FIGS. 7 and 8 show the effectiveness of the separating means in widening the gap for ease in cleaning. Thus, the present invention provides a simple but effective means of separating the spreader members in a carefully controlled manner without the possibility of overstressing the supporting springs. There is no requirement for any extra space for the separating means or special mounting and their cost is nominal.

Since certain changes may be made in the above device without departing from the scope of the invention herein involved, it is intended that all matter contained in the above description or shown in the accompanying drawings shall be interpreted as illustrative and not in a limiting sense.

I claim:
1. In a photographic camera, apparatus for distributing a liquid as a layer between two layers of photographic sheet material of which at least one is photosensitive and adapted for exposure to image-forming light within the camera comprising, in combination:
    a pair of substantially rigid members having substantially straight parallel adjacent portions juxtaposed to form a narrow pressure-generating gap through which said sheet material is movable;
    spring means for urging said members toward each other comprising a pair of elongated cantilever spring elements fastened to at least one of said rigid members at respectively opposite ends of said narrow gap and stressed to exert a predetermined initial force on said members tending to close said gap, said members being so constructed as to effect the distribution of said liquid in a layer between layers of said sheet material during movement of said material through said gap; and separating means for widening said pressure-generating gap, including a camming means contacting said spring means, said camming means being operable to urge said spring means in a direction forcing said rigid members apart and widening said gap.

2. A photographic apparatus for distributing a liquid as a layer between two layers of photographic sheet material comprising, in combination:

a pair of substantially rigid members having substantially straight parallel adjacent portions juxtaposed to form a narrow pressure-generating gap through which said sheet material is movable;

spring means for urging said members toward each other comprising a pair of elongated cantilever spring elements fastened to at least one of said rigid members at respectively opposite ends of said narrow gap and stressed to exert a predetermined initial force on said members tending to close said gap, said members being so constructed as to effect the distribution of said liquid in a layer between layers of said sheet material during movement of said material through said gap; and separating means for widening said pressure-generating gap, including a camming means contacting said spring means, said camming means being operable to urge said spring means in a direction forcing said rigid members apart and widening said gap.

3. In a photographic camera, a device for distributing a liquid in a layer between two layers of photographic sheet material of which at least one is photosensitive and adapted for exposure to image-forming light within the camera, said device being adapted to use in combination with photographic apparatus from which said sheet material is withdrawn and comprising, in combination:

a pair of substantially rigid members having substantially straight parallel adjacent portions predeterminedly spaced apart to form a narrow pressure-generating gap through which said sheet material is movable in a plane, said members converging angularly toward each other to define a narrowing throat to guide said sheet material toward said narrow gap, each of said members exhibiting at the narrowest portion of said gap a sharply reduced radius of curvature to restrict the area of said members which bears on said sheet material;

spring means for urging said members toward each other comprising a pair of generally U-shaped elongated spring elements each including a pair of resiliently connected cantilever arms fastened to respective ones of said rigid members at opposite ends of said gap, said members being so constructed as to effect the distribution of said liquid in a layer between layers of said sheet material during movement of said material through said gap; and a separating means for separating the areas of the rigid members which bear on the sheet material for cleaning purposes, said separating means including camming means situated between each of the pairs of arms of said spring means and means for applying a torque to said camming means causing them to be angularly displaced thereby forcing said arms apart.

4. The invention of claim 3 wherein the camming means are formed of a synthetic resinous material and the means for applying torque to the camming means comprise a sheet metal member having its ends embedded in said camming means.

5. A device for distributing a liquid in a layer between two layers of photographic sheet material, said device being adapted to use in combination with photographic apparatus from which said sheet material is withdrawn and comprising, in combination:

a pair of substantially rigid members having substantially straight parallel adjacent portions predeterminedly spaced apart to form a narrow pressure-generating gap through which said sheet material is movable in a plane, said members converging angularly toward each other to define a narrowing throat to guide said sheet material toward said narrow gap, each of said members exhibiting at the narrowest portion of said gap a sharply reduced radius of curvature to restrict the area of said members which bears on said sheet material;

spring means for urging said members toward each other comprising a pair of generally U-shaped elongated spring elements each spring element including a pair of resiliently connected cantilever arms fastened to respective ones of said rigid members at opposite ends of said gap, said members being so constructed as to effect the distribution of said liquid in a layer between layers of said sheet material during movement of said material through said gap; and a separating means for separating the areas of the rigid members which bear on the sheet material for cleaning purposes, said separating means including camming means situated between each of the pairs of arms of said spring means and means for applying torque to said camming means causing them to be angularly displaced thereby forcing said arms apart.

6. The invention of claim 5 wherein the camming means are formed of a synthetic resinous material and the means for applying torque to the camming means comprise a sheet metal member having its ends embedded in said camming means.

7. The invention of claim 6 wherein the camming means have longer and shorter shoulder portions which engage said spring arms, the longer shoulder portion being spaced between the spring arms when the arms are forced apart when cleaning the spreader members mounted thereon and the shorter shoulder portions being spaced between the spring arms when the arms are in their normally spaced position for supporting the spreader members in juxtaposed narrow gap forming relation to one another.

References Cited

UNITED STATES PATENTS 2,854,904  10/1958  Bishop _____ 95—13

NORTON ANSHER, *Primary Examiner.*

R. L. MOSES, *Assistant Examiner.*

U.S. Cl. X.R.

95—89; 226—89, 165